(12) United States Patent
Klenk et al.

(10) Patent No.: US 10,082,218 B2
(45) Date of Patent: Sep. 25, 2018

(54) ELECTROMAGNETIC ACTUATING DEVICE

(71) Applicant: Robert Bosch GmbH, Stuttgart (DE)

(72) Inventors: Alexander Klenk, Markgroeningen (DE); Klaus Schudt, Nordheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/808,174

(22) Filed: Nov. 9, 2017

(65) Prior Publication Data
US 2018/0151282 A1 May 31, 2018

(30) Foreign Application Priority Data

Nov. 30, 2016 (DE) .................. 10 2016 223 870

(51) Int. Cl.
*F16K 31/06* (2006.01)
*F16K 47/00* (2006.01)
*F16K 7/14* (2006.01)

(52) U.S. Cl.
CPC ............ *F16K 31/0655* (2013.01); *F16K 7/14* (2013.01); *F16K 31/0689* (2013.01); *F16K 47/00* (2013.01)

(58) Field of Classification Search
CPC .... F16K 7/14; F16K 31/0655; F16K 31/0689; F16K 47/00

USPC ............ 251/48, 54, 129.01–129.22; 335/240
See application file for complete search history.

(56) References Cited

U.S. PATENT DOCUMENTS

| | | | | |
|---|---|---|---|---|
| 3,108,777 A | * | 10/1963 | Ray ..................... | F16K 31/0689 251/129.01 |
| 6,293,514 B1 | * | 9/2001 | Pechoux .................. | F16K 1/52 137/625.3 |
| 8,154,370 B2 | * | 4/2012 | Ishibashi ................. | H01F 7/081 251/129.15 |
| 2009/0026399 A1 | * | 1/2009 | Ishibashi ............. | F16K 31/0613 251/129.15 |
| 2009/0140189 A1 | * | 6/2009 | Kokubu .............. | F16K 31/0613 251/129.15 |
| 2012/0126158 A1 | * | 5/2012 | Yasoshima .......... | F16K 31/0613 251/129.15 |

* cited by examiner

*Primary Examiner* — John Bastianelli
(74) *Attorney, Agent, or Firm* — Norton Rose Fulbright US LLP; Gerard Messina

(57) ABSTRACT

An electromagnetic actuating device, in particular for actuating an hydraulic slide valve of an automatic transmission. It has a pole body, an armature element having a first channel that extends axially overall, and an actuating element, which is separate from the armature element, the armature element being guided in the pole body, and first effective section of the armature element on the end face is at least intermittently in contact with a second effective section of the actuating element on the end face, the first channel fluidically communicating with a second channel implemented in or on the actuating element when the effective sections are in contact.

19 Claims, 4 Drawing Sheets

US 10,082,218 B2

ELECTROMAGNETIC ACTUATING DEVICE

CROSS REFERENCE

The present application claims the benefit under 35 U.S.C. § 119 of German Patent Application No. DE 102016223870.1 filed on Nov. 30, 2016, which is expressly incorporated herein by reference in its entirety.

FIELD

The present invention relates to an electromagnetic actuating device, in particular an electromagnetic actuating device for operating a hydraulic slide valve of an automatic transmission.

BACKGROUND INFORMATION

In automatic transmissions of current motor vehicles, clutches for shifting gears are usually actuated hydraulically. To ensure that the gear shifts, i.e., the shifting operations, take place without jerks and go unnoticed by the driver, it is necessary to adjust the hydraulic pressure at the clutches according to predefined pressure ramps with the highest precision possible. The pressure required for adjusting these pressure ramps is supplied with the aid of hydraulic slide valves. Such slide valves are frequently actuated via an electromagnetic actuating device. The use of the electromagnetic actuating device according to the present invention in an automatic transmission of this kind is a preferred application field of the electromagnetic actuating device according to the present invention. If an electromagnetic actuating device is used for actuating a slide valve in an automatic transmission, then the electromagnetic actuating device is partially or completely immersed in the transmission fluid of the automatic transmission.

Such an electromagnetic actuating device includes an armature element, which is axially moved by energizing a coil. Transmission oil must be displaced during a movement of the armature element, which is usually achieved with the aid of a channel in or on the armature element. Transmission oil is able to flow through or along the armature element by way of the channel.

Conventional electromagnetic actuating devices include a channel for the fluidic passage of transmission oil extends through an actuating element that is pressed into the armature element, and through the armature.

SUMMARY

It is an object of the present invention to provide an electromagnetic actuating device, for which the actuating element is able to be produced in a cost-effective and uncomplicated manner and in which the electromagnetic actuating device is meant to operate in a reliable manner even when the actuating device is immersed in fluid.

This objective may be achieved by an electromagnetic actuating device in accordance with the present invention. When the effective sections of the armature element and the actuating element are in contact, a first channel of the armature element, which has an overall axial extension, communicates fluidically with a second channel provided in or on the actuating element. Such a design of the actuating device ensures a reliable functioning of the actuating device even when the actuating device is immersed in fluid. On account of their design, the armature element and the actuating element are able to be produced and assembled independently of each other and as separate elements. A movement linkage of the armature element and the actuating element takes place by the contact between their respective effective sections. The actuating element can thus be produced in a cost-effective manner as an injection-molded part. The actuating element, too, is developed separately from the armature element, which makes the actuating device according to the present invention particularly flexible.

It is especially preferred if the second channel at least regionally openly extends in an external surface, especially in the first effective section of the actuating element, and/or if the second channel extends at least regionally in a plane that runs perpendicular to an axis of actuation. The open characteristic of the second channel in the second effective section allows for a particularly cost-effective production of the actuating element. This is due to the fact that the second channel is already able to be introduced into the actuating element during the shaping process, and retroactive processing of the actuating element is not required. In this case, it is particularly advantageous if the actuating element is produced with the aid of a plastic injection method, advantageously using a high-strength plastic such as polyetheretherketone.

The second channel, which extends openly in the external surface of the actuating element, is able to be provided in the actuating element during the injection-molding process. Conventional channels are frequently realized by a retroactive drilling operation, which is cost- and time-intensive. These channels extend through the corresponding component rather than take the form of open channels in its external surface.

It is also advantageous if a first fluid space, which abuts a first end face of the armature element, communicates fluidically with a second fluid space which abuts a second end face of the armature element, the communication taking place via the first, overall axially extending channel of the armature element and via the second channel present in or on the actuating element. This allows for a reliable displacement of fluid between the first and the second fluid spaces during the movement of the armature element and the actuating element.

It is also advantageous if the first channel has a diaphragm section in which the first channel has a minimal flow cross-section; the flow cross-section of the first channel in the diaphragm section preferably amounts to between 0.25% and 2.25%, and preferably to between 0.5% and 1.5%, and in particular to between 0.75% and 1.25%, especially 1% of the cross-sectional area of the armature element. The cross-sectional area of the armature element refers to the area that displaces fluid during the movement of the armature element. In the case of a stepped armature element, the relevant cross-sectional area thus extends in multiple planes, which are disposed perpendicular to the axis of movement of the armature element. The diaphragm section having the minimal flow cross-section of the first channel is the particular section of the channel in which the flow resistance reaches a maximum on account of a constriction of the flow cross-section. This may also be a part of the channel in which the channel is divided into two parts. For example, one part of the channel may be individually realized and have a first flow cross-section. This part of the channel may then be split into two sub-channels which, when considered as a whole, have a smaller flow cross-section than the previous part of the channel. This bipartite part thus represents the diaphragm section. The diaphragm section makes it possible for the transmission oil that is flowing through the armature element to simultaneously dampen the movement of the armature element during the passage through the armature element. Said ratios of the flow cross-section in the diaphragm section to the cross-sectional area of the armature element constitute proportions that represent a sufficient measure of damping at a simultaneously sufficiently faster reaction time of the armature element and thus of the electromagnetic actuating device as a whole. Transmission oil that must reach the other side of the armature element while the armature is moving flows through the first channel in the armature element. The flow of the transmission oil is locally throttled by the diaphragm section, and the forces created in the process dampen the movement of the armature element.

In addition, it is advantageous if the flow cross-section of the first channel outside the diaphragm section amounts to between 2.25% and 6.25%, and preferably to between 3% and 5%, and especially to between 3.5% and 4.5%, in particular to 4%, of the cross-sectional area of the armature element. The movement of the armature element will then not be adversely affected by the displacement of the transmission oil, and/or will be sufficiently dampened in combination with the afore-described diaphragm section.

It is also advantageous if the second channel has an effective flow cross-section that lies between 100% and 300%, and preferably between 125% and 250%, and especially between 150% and 200% of the flow cross-section of the armature element of the first channel in the diaphragm section. This allows transmission oil that is flowing out of the first channel in the armature element and into the second channel in or on the actuating element to flow freely into the second channel. This has the advantage that the dynamic pressure of the transmission oil has no adverse effect on the contact between the two effective sections on the actuating element and on the armature element. The electromagnetic actuating element according to this specific embodiment operates in a particularly reliable and precise manner inasmuch as the actuating element is moved very precisely by the armature element.

It is also advantageous if the surface of the first effective section of the armature element amounts to between 12% and 21% and, preferably, to between 15% and 17.5% of the cross-sectional area of the armature element. Since the armature element is guided in a pole body, an acentric loading of the armature element, such as by an uneven force distribution across the effective section, leads to increased friction of the armature element on the pole body. The smaller the effective section, the lower the influence of an acentric loading in the effective section. However, an effective section that is too small is disadvantageous inasmuch as the contact pressure in the effective section becomes too great and damage to the actuating element or the armature element may occur. The indicated value range represents an advantageous proportion for the effective section to the cross-sectional surface of the armature element. Given corresponding dimensions, neither damage to the armature element or the actuating element will occur, nor will the movement of the armature element be adversely affected by possibly arising acentric loading in the effective section.

In one advantageous specific embodiment of the actuating device according to the present invention, the actuating element has on its end facing the armature element a radial expansion, which forms a stop for the armature element and is situated between a first end face of the armature element and the pole body, thereby preventing their direct contact. This specific embodiment offers the advantage that the armature element does not make contact with the pole body, so that a magnetic adhesion of the armature element to the pole body is avoided. The armature element thereby always retains its fast reaction time. The development of the stop as part of the actuating element constitutes a cost-effective and uncomplicated construction measure for realizing the stop.

It is also advantageous if the actuating element is supported in a guide opening in the pole body and if a third channel is formed in the guide opening between the actuating element and the pole body, by way of which the first fluid space, which abuts the first end face of the armature element, is fluidically connected to a third fluid space situated outside the pole body. This allows transmission fluid to drain through the third channel between the actuating element and the pole body toward the third fluid space. As a result, the responsiveness of the actuating device is increased, meaning that the actuating device is able to switch more rapidly.

It is also advantageous if the armature element includes an armature base body and a contact element that is connected to the armature base body in a non-positive and/or positive manner, the contact element encompassing the effective section of the armature element. Because of this bipartite armature element including the armature base body and the contact element, the dimension of the armature element is able to be precisely adjusted when the armature element is assembled. For example, a contact element may be pressed onto the armature base body or pressed into the armature base body. In the process, the contact element is preferably pressed into the first channel. Since the first effective section of the armature element is developed on the contact element, the effective size of the armature element is able to be precisely adjusted through the positioning of the contact element with regard to the armature element. This makes it possible to produce armature elements featuring greater production tolerances, which saves money.

It is advantageous if the diaphragm section is disposed in the contact element of the armature element. This is a particularly cost-effective variant of the actuating device inasmuch as the first channel in the armature element is able to be produced by a simple drilling operation, for example, and the diaphragm section may be realized by pressing the contact element onto or into the armature element base body.

Additional features, application possibilities and advantages of the present invention result from the description below of exemplary embodiments of the present invention, which are explained with the aid of the figures. The features may be essential for the present invention both on their own and in different combinations, even if this is not explicitly indicated again.

DETAILED DESCRIPTION OF EXAMPLE EMBODIMENT

Figure 1:
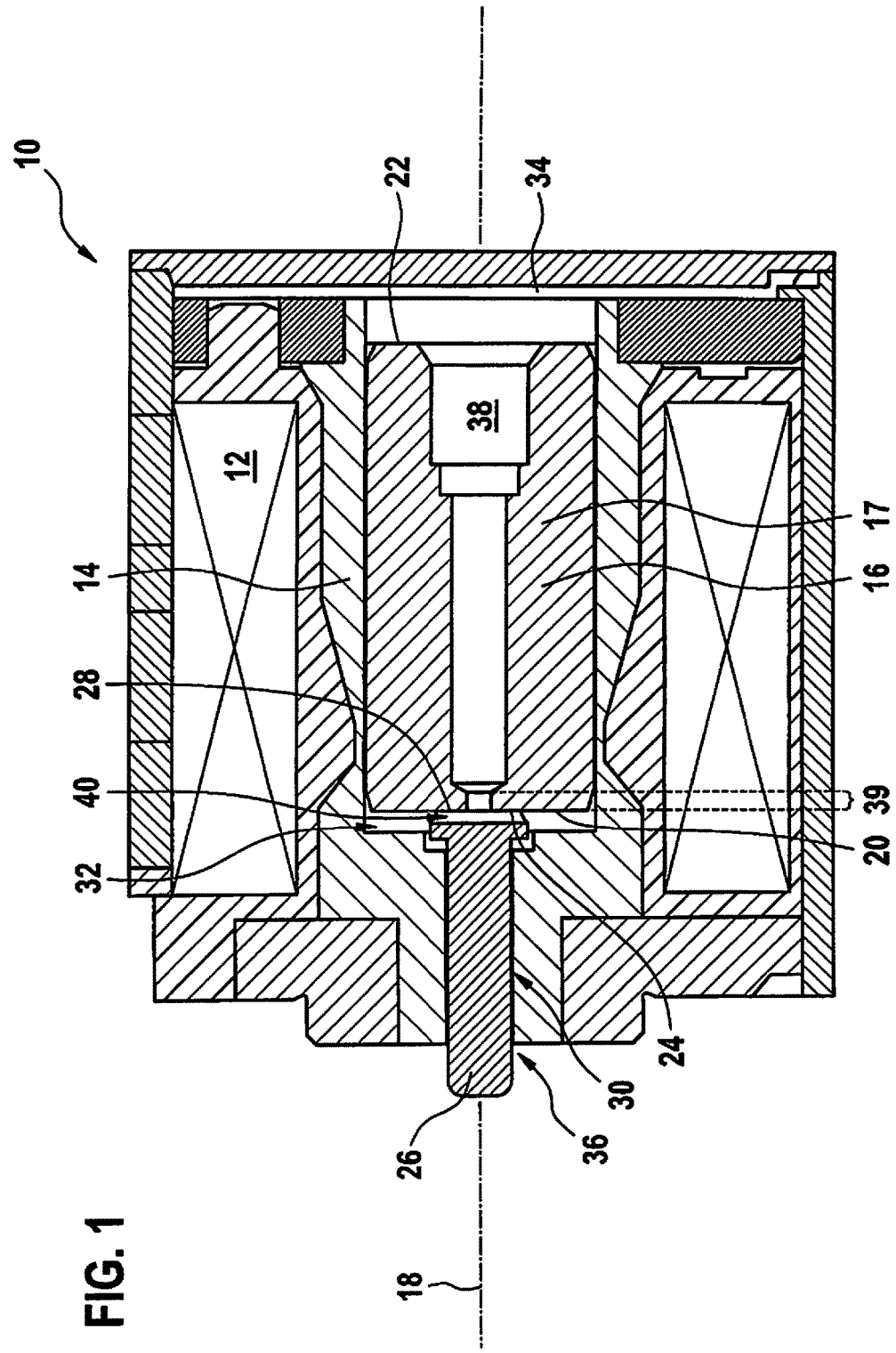
FIG. 1 shows a sectional view of an actuating device according to the present invention.

In FIG. 1, an electromagnetic actuating device according to the present invention bears as a whole reference numeral 10. Actuating device 10 includes a coil 12 as well as a pole body 14. In this instance, pole body 14 is for the most part developed in tubular form. An armature element 16 having an armature base body 17 is situated inside pole body 14. Armature element 16 is guided inside pole body 14 for the execution of movements along an axis of movement 18. Armature element 16 has a first end face 20 and a second end face 22, which lie across from each other.

A first effective section 24 of armature element 16 is situated on first end face 20 of armature element 16. In the illustration of FIG. 1, an actuating element 26 is resting against first effective section 24 of armature element 16. Actuating element 26 rests against first effective section 24 of armature element 16 via a second effective section 28 situated on its end face.

Actuating element 26 is guided in a narrowed area of pole body 14, which forms a guide opening 30. Guide opening 30 is implemented as a bore in this particular example.

A first fluid space 32 is situated between first end face 20 of armature element 16 and pole body 14, and a second fluid space 34 is disposed adjacent to second end face 22 of armature element 16. On the side of first fluid space 32 lying opposite from guide opening 30 of pole body 14 is a third fluid space 36.

A first channel 38 is situated in armature element 16. First channel 38 has a diaphragm section 39. The flow cross-section of first channel 38 is minimal in diaphragm section 39 because the diameter of first channel 38 at that location is lowest along the extension of diaphragm section 39.

In the configuration illustrated in FIG. 1, first channel 38 is fluidically connected to a second channel 40. Second channel 40 is developed at the surface of actuating element 26. Stated more precisely, second channel 40 extends in second effective section 28 of actuating element 26 in an open fashion, and runs through it, meaning that it terminates therefrom at two locations of second effective section 28. In this case, second channel 40 has a semi-cylindrical form, which can be gathered from FIG. 2, in particular. First fluid space 32 and second fluid space 34 are in fluidic communication via first channel 38 and second channel 40.

Actuating device 10 is operated in the manner described in the following text. In the operating state, actuating device 10 is partially or completely immersed in transmission oil, and virtually all cavities are filled with transmission oil. By energizing coil 12, a magnetic flux is generated in the iron core, and thus in pole body 14 and in armature element 16. This causes armature element 16 to be moved along axis of movement 18 in the direction of actuating element 26. Since first effective section 24 and second effective section 28 are in contact, a movement of armature element 16 is transferred to actuating element 26, and the latter is moving along axis of movement 18 as well. Transmission oil that is located in first fluid space 32 is displaced during the movement of armature 16. This displaced transmission oil flows via second channel 40 into first channel 38, and from there into second fluid space 34. If armature element 16 moves in the opposite direction, then the flow direction of the transmission oil is reversed.

Figure 2:
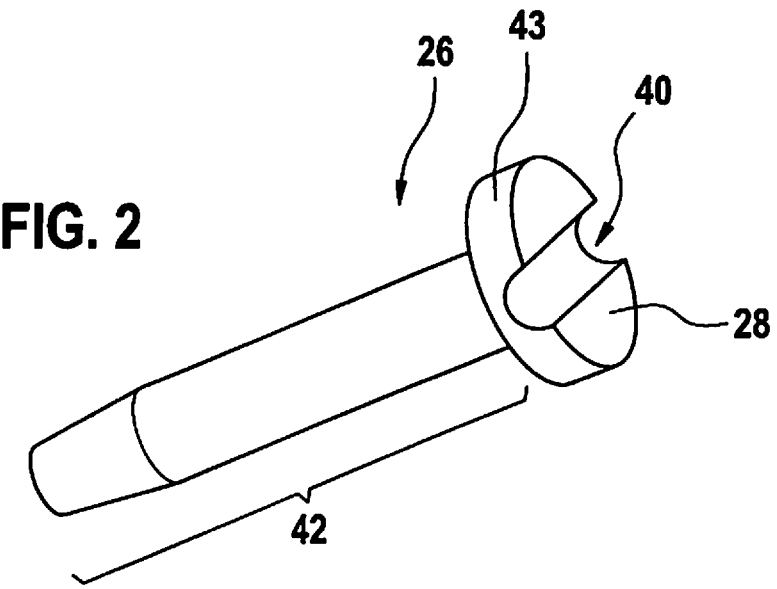
FIG. 2 shows an individual representation of the actuating element from FIG. 1.

FIG. 2 shows actuating element 26 in detail. Here, the open characteristic of second channel 40 in second effective section 26 can be seen particularly well. In addition to shaft section 42, actuating element 26 has a radial enlargement 43. In the assembled state of actuating device 10, radial enlargement 43 is developed on an end of actuating element 26 that faces armature element 16. The radial enlargement forms a stop for armature element 16 and is situated between first end face 20 of armature element 16 and pole body 14. When armature element 16 moves, radial enlargement 43 prevents contact between armature element 16 and pole body 14. This prevents armature element 16 from magnetically "sticking" to pole body 14, or in other words, ensures a residual gap.

Figure 3:
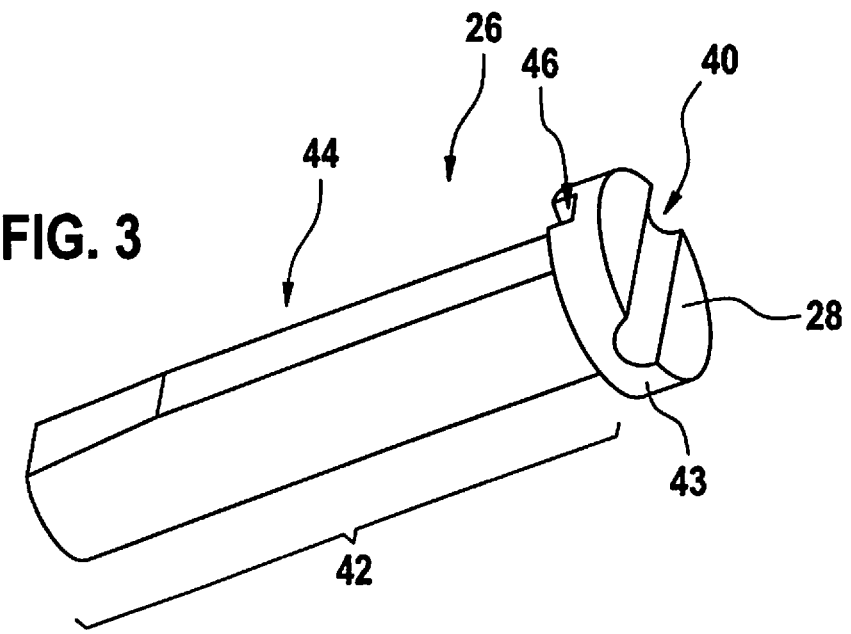
FIG. 3 shows an alternative specific embodiment of the actuating element from FIG. 2.

FIG. 3 shows an alternative specific embodiment of actuating element 26. Like actuating element 26 from FIG. 2, actuating element 26 from FIG. 3 also includes second channel 40. However, while actuating element 26 from FIG. 2 has a cylindrical design with a tip in the form of a truncated cone in the region of its shaft section 42, actuating element 26 from FIG. 3 has a two-sided flattened area 44 on shaft section 42.

When actuating element 26 from the specific embodiment according to FIG. 3 is used in actuating device 10 from FIG. 1, then a third channel is formed between pole body 14 and actuating element 26 by two-sided flattened area 44 on shaft section 42 of actuating element 26. A portion of this third channel is also formed by a groove 46 on actuating element 26. In this specific embodiment, transmission oil that is located in first fluid space 32 is able to drain toward third fluid space 36 in response to a movement of armature element 16. In the process, the transmission oil flows via the third channel, which is formed between pole body 14 and actuating element 26 by two-sided flattened area 44 on shaft section 42, to third fluid space 36.

Figure 4:
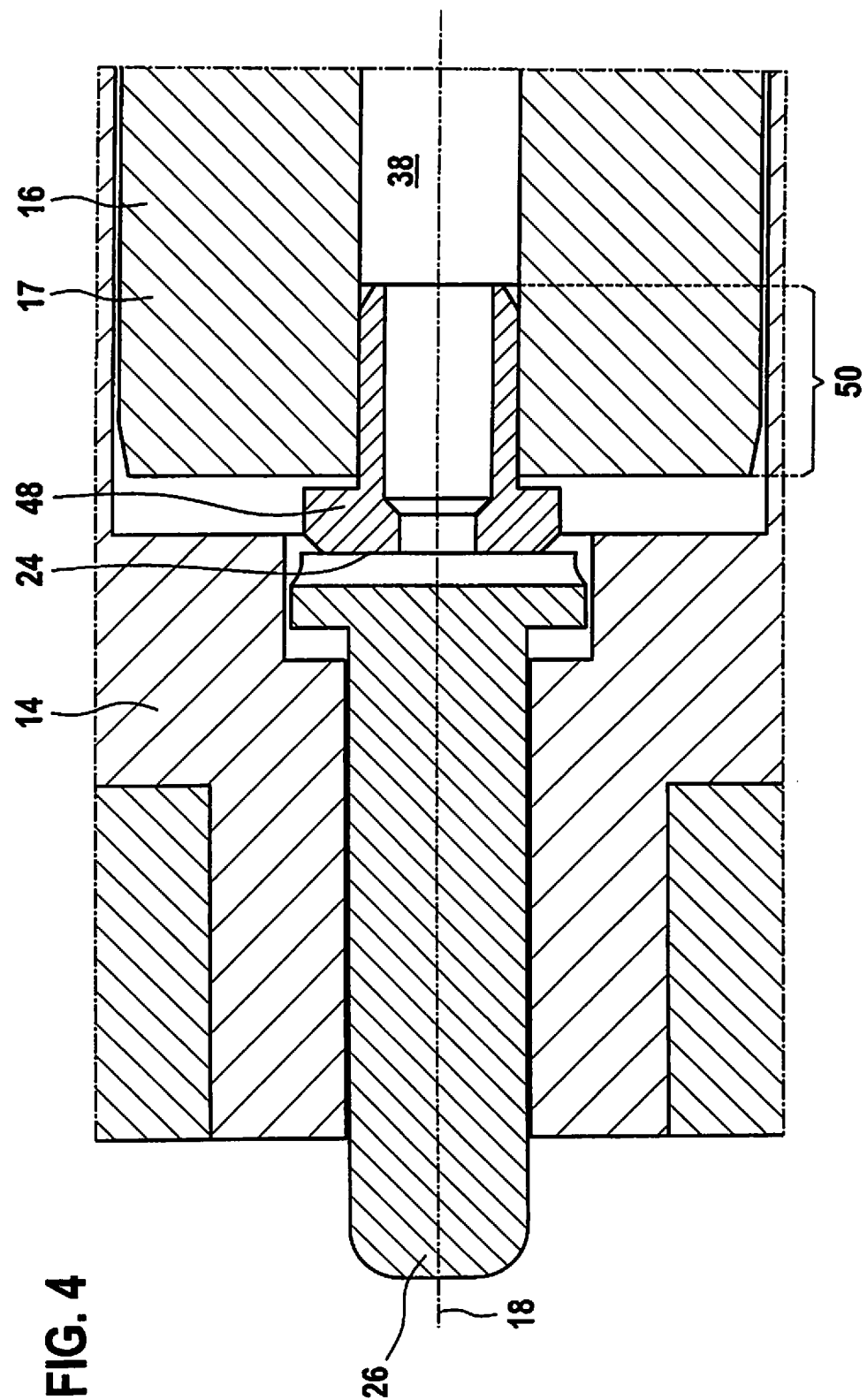
FIG. 4 shows an enlarged individual representation of an area around effective sections of an alternative specific embodiment.

FIG. 4 shows an alternative specific embodiment of actuating device 10 from FIG. 1, armature element 16 including armature base body 17 as well as a contact element 48. Contact element 48 is pressed into first channel 38, which is situated in armature element 16. Contact element 48 includes first effective section 24 and diaphragm section 39. An insertion depth 50 of contact element 48 is able to be varied when armature element 16 is assembled. This allows for a precise adjustment of the extension of armature element 16 along axis 18 during the assembly.

Figure 5:
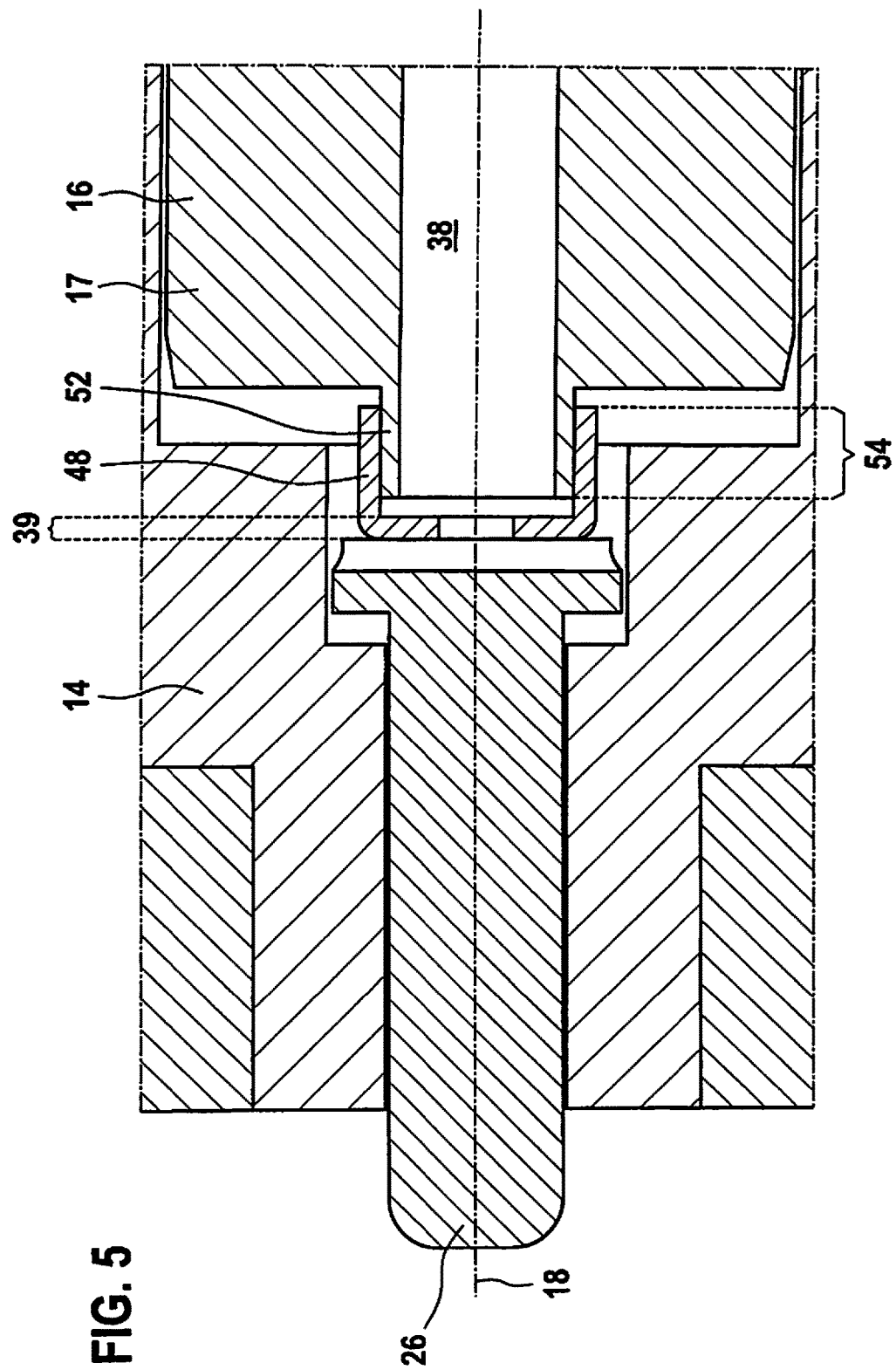
FIG. 5 shows a further alternative specific embodiment in a representation according to FIG. 4.

In the embodiment variant shown in FIG. 5, contact element 48 is pressed onto a projecting part 52 developed on armature base body 17. In this specific embodiment, too, diaphragm section 39 is developed on contact element 48. In the specific embodiment of FIG. 5, an extension of a press-on section 54 is variably adjustable, so that the extension of armature element 16 along axis 18 is also able to be adjusted in a variable manner in this specific embodiment.

Since the magnetic force exerted on armature element 16 when coil 12 is energized is not uniform along the extension of axis 18 but is position-dependent, press-in depth 50 or press-on depth 54 in combination with the height of radial enlargement 43 on actuating element 26 define the distance between armature base body 17 and pole body 14. Coordinating press-in depth 50 or press-on depth 54 in the production process therefore makes it possible to influence the precision of the pressure to be adjusted. Therefore, the possibility of the precise adjustment of the length of armature element 16 provided in the specific embodiments according to FIGS. 4 and 5 results in an advantageous increase in the precision of actuating element 10.

What is claimed is:

1. An electromagnetic actuating device for actuating a hydraulic slide valve of an automatic transmission, comprising:
    a pole body;
    an armature element including a first channel which extends axially overall;
    an actuating element, which is separate from the armature element, the armature element being guided in the pole body, and a first effective section of the armature element on an end face is at least intermittently in contact with a second effective section of the actuating element on an end face;

wherein the first channel fluidically communicates with a second channel implemented in or on the actuating element when the first and second effective sections are in contact.

2. The electromagnetic actuating device as recited in claim 1, wherein at least one of: (i) the second channel at least regionally openly extends in an external surface in the second effective section of the actuating element, and (ii) the second channel extends at least regionally in a plane that runs perpendicular to an axis of movement.

3. The electromagnetic actuating device as recited in claim 1, wherein the first channel has a diaphragm section in which the first channel has a minimal flow cross-section, and the flow cross-section of the first channel in the diaphragm section amounts to between 0.25% and 2.25% of a cross sectional area of the armature element.

4. The electromagnetic actuating device as recited in claim 1, wherein the first channel has a diaphragm section in which the first channel has a minimal flow cross-section, and the flow cross-section of the first channel in the diaphragm section amounts to between 0.5% and 1.5% of a cross sectional area of the armature element.

5. The electromagnetic actuating device as recited in claim 1, wherein the first channel has a diaphragm section in which the first channel has a minimal flow cross-section, and the flow cross-section of the first channel in the diaphragm section amounts to between 0.75% and 1.25% of a cross sectional area of the armature element.

6. The electromagnetic actuating device as recited in claim 1, wherein the first channel has a diaphragm section in which the first channel has a minimal flow cross-section, and the flow cross-section of the first channel in the diaphragm section amounts to 1% of a cross-sectional area of the armature element.

7. The electromagnetic actuating device as recited in claim 1, wherein a flow cross-section of the first channel outside the diaphragm section amounts to between 2.25% and 6.25% of a cross-sectional area of the armature element.

8. The electromagnetic actuating device as recited in claim 1, wherein a flow cross-section of the first channel outside the diaphragm section amounts to between 3% and 5% of a cross-sectional area of the armature element.

9. The electromagnetic actuating device as recited in claim 1, wherein a flow cross-section of the first channel outside the diaphragm section amounts to between 3.5% and 4.5% of a cross-sectional area of the armature element.

10. The electromagnetic actuating device as recited in claim 1, wherein a flow cross-section of the first channel outside the diaphragm section amounts to 4% of a cross-sectional area of the armature element).

11. The electromagnetic actuating device as recited in claim 1, wherein the second channel has an effective flow cross-section that lies between 100% and 300% of a flow cross-section of the first channel in the diaphragm section.

12. The electromagnetic actuating device as recited in claim 1, wherein the second channel has an effective flow cross-section that lies between 125% and 250% of a flow cross-section of the first channel in the diaphragm section.

13. The electromagnetic actuating device as recited in claim 1, wherein the second channel has an effective flow cross-section that lies between 150% and 200% of a flow cross-section of the first channel in the diaphragm section.

14. The electromagnetic actuating device as recited in claim 1, wherein an area of the first effective section of the armature element amounts to between 12% and 21% of a cross-sectional area of the armature element.

15. The electromagnetic actuating device as recited in claim 1, wherein an area of the first effective section of the armature element amounts to between 15% and 17.5% of a cross-sectional area of the armature element.

16. The electromagnetic actuating device as recited in claim 1, wherein the actuating element has a radial enlargement on its end facing the armature element, which forms a stop for the armature element and is situated between a first end face of the armature element and the pole body, so that it prevents their direct contact.

17. The electromagnetic actuating device as recited in claim 1, wherein the actuating element is supported in a guide opening in the pole body, and a third channel between the actuating element and the pole body is formed in the guide opening, via which a first fluid space, which abuts a first end face of the armature element, is fluidically connected to a third fluid space situated outside the pole body.

18. The electromagnetic actuating device as recited in claim 1, wherein the armature element has an armature base body and a contact element that is connected to the armature base body in at least one of a non-positive and positive manner, the contact element including the first effective section of the armature element.

19. The electromagnetic actuating device as recited in claim 18, wherein the diaphragm section is situated in the contact element of the armature element.

* * * * *